United States Patent
Mair

(10) Patent No.: US 10,884,714 B2
(45) Date of Patent: Jan. 5, 2021

(54) METHOD FOR MODIFYING MODELS FOR GENERATING SOURCE CODE

(71) Applicant: DSPACE DIGITAL SIGNAL PROCESSING AND CONTROL ENGINEERING GMBH, Paderborn (DE)

(72) Inventor: Michael Mair, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 0 days.

(21) Appl. No.: 16/578,441

(22) Filed: Sep. 23, 2019

(65) Prior Publication Data

US 2020/0104103 A1 Apr. 2, 2020

(30) Foreign Application Priority Data

Sep. 28, 2018 (DE) .................. 10 2018 124 064

(51) Int. Cl.
- *G06F 8/35* (2018.01)
- *G06F 8/34* (2018.01)
- *G06F 8/41* (2018.01)
- *G06N 20/00* (2019.01)

(52) U.S. Cl.
CPC .................. *G06F 8/35* (2013.01); *G06F 8/34* (2013.01); *G06F 8/41* (2013.01); *G06N 20/00* (2019.01)

(58) Field of Classification Search
CPC ..... G06F 8/35; G06F 8/34; G06F 8/41; G06N 20/00
See application file for complete search history.

(56) References Cited

U.S. PATENT DOCUMENTS

| | | | |
|---|---|---|---|
| 8,151,244 B2* | 4/2012 | Hsu ........................... | G06F 8/34 717/113 |
| 2007/0239700 A1* | 10/2007 | Ramachandran ... | H04L 41/0813 |
| 2008/0046863 A1 | 2/2008 | Chandrashekar et al. | |
| 2016/0344738 A1* | 11/2016 | Dotan ................. | H04L 63/0263 |
| 2016/0344773 A1* | 11/2016 | Knjazihhin ........... | G06F 21/604 |
| 2017/0054757 A1* | 2/2017 | Siswick ................ | H04L 63/102 |
| 2017/0277521 A1* | 9/2017 | Sharma ..................... | G06F 8/35 |
| 2018/0060457 A1* | 3/2018 | Homann ............. | G06F 30/3323 |

* cited by examiner

*Primary Examiner* — Viva Miller

(74) *Attorney, Agent, or Firm* — Leydig, Voit & Mayer, Ltd.

(57) ABSTRACT

A method for transferring changes between block diagrams having cyclically calculated models of blocks connected to signals includes: applying a plurality of transformation rules to the first block diagram to obtain a first intermediate model, wherein a transformation rule includes a rule for identifying blocks and a change to be applied to recognized blocks, wherein at least one extension block is inserted and/or at least one basic block is deleted; comparing the second block diagram to the first intermediate model; determining at least one configuration rule from the comparison, a configuration rule comprising a rule for identifying a block or parameter and a change to be applied to an extension parameter; applying the plurality of transformation rules to the third block diagram to obtain a second intermediate model; and applying the at least one configuration rule to the second intermediate model to obtain a fourth block diagram.

14 Claims, 4 Drawing Sheets

METHOD FOR MODIFYING MODELS FOR GENERATING SOURCE CODE

CROSS-REFERENCE TO PRIOR APPLICATIONS

Priority is claimed to German Patent Application No. DE 102018124064.3, filed on Sep. 28, 2018, the entire disclosure of which is hereby incorporated by reference herein.

FIELD

The invention relates to the modification of executable models, in particular block diagrams, and to the generation of source code for programming control devices from block diagrams.

BACKGROUND

Control devices are used in a variety of applications to record physical quantities of a process and/or to act on a process via connected actuators; for example, they may be an anti-blocking control of a braking process. The time constants that determine the dynamic behavior of the process often cause cycle times of 1 ms or shorter so that real-time capability of the control device is required. For cost reasons, control devices often have microcontrollers with low memory and limited computing power, for which reason the size and efficiency of the executable code is critical.

In order to accelerate the design of control devices, control strategies are frequently developed on the basis of models in a computing environment, such as MATLAB/Simulink. The process and/or controller or, in general, the behavior of the control device may thus be simulated first, and the presence of desired properties may be checked. In particular, the models may be block diagrams that contain blocks that perform operations, such as calculations, wherein a block can calculate an output signal from multiple input signals, for example. As a rule, block diagrams are executed cyclically, wherein all blocks are kept permanently in memory, and each block is executed once per time step. In particular, a block may apply one or more operations to input signals from the last step in order to generate output signals of the current step. In addition to a cyclically executed submodel for describing approximately time-continuous behavior, block diagrams may also include a submodel for describing a discrete behavior in which a number of states and transition conditions are defined.

Source code for programming the control device may be generated directly from the models via a code generator. For example, a code generator for generating production quality source code is described in the document entitled "Production Quality Code Generation from Simulink Block Diagrams," Proceedings of the 1999 International Symposium on Computer Aided Control System Design, Kohala Coast, Hi., by H. Hanselmann et al. In this case, the production code generated can be adapted by an additional annotation of the blocks or block variables. In particular, it is possible to provide a model originally produced for the calculation with floating-point variables of high accuracy with scalings, as a result of which the control device can calculate with fixed-point numbers in order to achieve a substantial reduction in computing time with low losses in accuracy.

Data-flow-oriented programming languages are now also in use in the field of edge computing, where large data volumes arise and must be analyzed efficiently. US 2017/0277521 A1 describes a method in which a plurality of data streams to which a series of functions is to be applied is identified in a development environment. Input data streams are present as queues with a plurality of elements which are to be combined, for example, into a common output data stream by a merge function. A designed program is translated into optimized platform-specific instructions in a two-stage translation tool. In doing so, the transformation functions applied to the individual data streams and the merge function are translated into deterministic finite automata and combined. As a result of this optimization, no buffers have to be provided for the intermediate stages of the merge function so that efficient combining of the data streams is made possible. Changes to the program may be made in a graphical user interface that includes a visualization component. Distributed development tools are not disclosed in the document.

In the case of larger development projects, different areas of development are frequently carried out by a plurality of people who may also work at different companies. The function developer, who creates and improves the model, can work continuously with floating-point numbers. A function model which was created once can also be used for different projects and adapted in terms of functionality. The additional annotation required for porting to the control device is generally made by a specialist for code generation, to whom the model is transferred in the corresponding project phase. For this step, only a few days are frequently available in which a large number of manual changes has to be made. If the project has a plurality of phases in each of which code generation is to take place, the problem is exacerbated; even if the underlying model has remained essentially the same, the additional annotation often continues to be manual work.

Comparison programs, which in many cases also allow three-way comparison, exist for texts, such as source code in a high-level language, which are arranged in lines with a plurality of words each. This three-way comparison is particularly helpful when a plurality of different versions of a text was created on the basis of an initial version, for example by two programmers working in parallel on the source code. The comparison between models is made more difficult by the structure of block diagrams, which is more complex in relation to texts, or in general by graphic models. In order to improve manageability, US 2018/0060457 A1 proposes filtering or reprocessing the result of a comparison between two block diagrams via scripts. Particularly in the case of hierarchical block diagrams comprising a plurality of different hierarchy levels, transferring changes is only possible to a very limited extent. U.S. Pat. No. 8,151,244 B2 describes a method for merging or combining graphic programs, in which a common predecessor is taken into account. In this case, however, it is necessary for models to use the same version of the development environment and to have no deviating additional annotation so that an automated transfer of changes in a function model to an annotated model for code generation cannot be carried out.

SUMMARY

In an exemplary embodiment, the present invention provides a method for transferring changes between block diagrams comprising cyclically calculated models of blocks connected to signals. A basic model comprises one or more basic blocks, wherein a basic block comprises one or more basic parameters. An extension model comprises one or more basic blocks and at least one extension block. An extension block comprises one or more parameters for code generation. A first block diagram comprises a basic model in a first version. A second block diagram comprises an extension model resulting from the basic model of the first version. A third block diagram comprises a basic model in a second version. The first version is older than the second version. The method comprises: applying a plurality of transformation rules to the first block diagram to obtain a first intermediate model, wherein a transformation rule includes a rule for identifying blocks and a change to be applied to recognized blocks, wherein at least one extension block is inserted and/or at least one basic block is deleted; comparing the second block diagram to the first intermediate model; determining at least one configuration rule from the comparison, a configuration rule comprising a rule for identifying a block or parameter and a change to be applied to an extension parameter; applying the plurality of transformation rules to the third block diagram to obtain a second intermediate model; and applying the at least one configuration rule to the second intermediate model to obtain a fourth block diagram.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
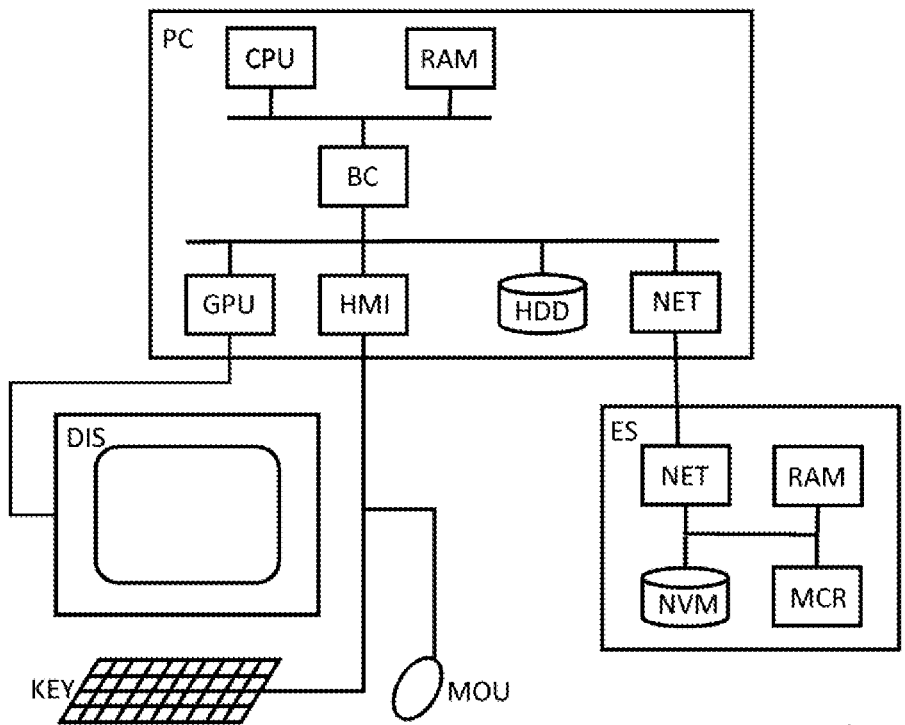
FIG. 1 depicts an exemplary embodiment of a computer system.

Exemplary embodiments of the present invention support the transfer of changes between various model types.

In an exemplary embodiment, a method for transferring changes between block diagrams is thus provided. The block diagrams comprise cyclically calculated models of blocks connected to signals, a basic model comprising one or more basic blocks, a basic block comprising one or more basic parameters, an extension model comprising one or more basic blocks and at least one extension block, an extension block comprising at least one additional extension parameter, in particular one or more parameters for code generation. A first block diagram includes a basic model in a first version, a second block diagram includes an extension model originated from the basic model of the first version, and a third block diagram includes a basic model in a second version, wherein the first version is older than the second version. According to the invention, the method comprises the steps of applying a plurality of transformation rules to the first block diagram in order to obtain a first intermediate model, wherein a transformation rule includes a rule for identifying blocks and a change to be applied to recognized blocks, wherein at least one extension block is inserted and/or at least one basic block is deleted, comparing the second block diagram to the first intermediate model, determining at least one configuration rule from the comparison, a configuration rule comprising a rule for identifying a block or parameter and a change to be applied to at least one parameter, in particular an extension parameter, applying the plurality of transformation rules to the third block diagram in order to obtain a second intermediate model, and applying the at least one configuration rule to the second intermediate model in order to obtain a fourth block diagram. The fourth block diagram may advantageously comprise an extension model in a second version and may be particularly prepared for code generation.

If two or more blocks are connected to signals, this may be indicated in the model with a signal line, and signals or data can be transferred between the connected blocks; in this case, in particular, a first block outputs a value or, depending on the definition, a plurality of associated values, and a second block receives these values and takes them into account in determining one or more associated output values of the second block. Signals can contain scalar variables and/or structured data types such as arrays, as is the case with a bus, for example. Unlike signals, parameters of blocks remain fixed during execution of the model or of the generated code; they serve in particular to determine properties of the block or of the generated code and are therefore usually changed only during modeling.

For models with various semantic layers, that is to say at least one basic model and at least one extension model are present, a direct three-way merge is not sensible. Instead, the differences between models with various semantic layers but of an identical version are considered separately from differences between models of different versions. In the transition from one semantic layer to another, a basic block may in particular be replaced by an extension block; a basic block may also be replaced by one or more blocks, at least one of which is an extension block. In this case, the implemented functionalities of the basic model and of the extension model are frequently largely the same. Certain differences between calculated signal values can be caused, for example, by the use of fixed-point data types in the extension model. Between models of different versions, significant functional differences may occur if the user has inserted a group of blocks, for example.

The treatment of the individual blocks and/or of delineated block groups may be formulated as a transformation rule comprising a rule for identifying blocks and a change to be applied to recognized blocks, wherein at least one extension block is inserted and/or at least one basic block is deleted. According to a further consideration, transformation rules can generally be fixed since a basic block can always be replaced independently of its position with the same extension block or the same group of blocks. For example, a transformation rule may state that a base port outputting a signal is replaced by the corresponding extension port; this is generally true and can therefore be easily automated. It may be checked for each block of a basic model whether the identification rule is fulfilled, and if so, the predetermined change is applied in each case.

The additional attribution or the at least one extension parameter can in particular comprise settings for code generation, such as a scaling, a value range, a variable class or a data type. For example, a scaling of an extension block also depends on the scaling and possibly the operations of adjacent extension blocks, that is to say the local environment. According to a further consideration, configuration rules can thus be context-dependent and may therefore be determined from a comparison of two models of the same version. By transforming the basic model in the first or old version into an intermediate model which corresponds to the extension model with regard to the semantic layer, a suitable basis for comparison is created in order to be able to adopt as many of these context-dependent changes as possible in an automated manner. The user must make less manual adjustments in order to prepare the model in the new version for code generation.

If models run through many different versions, configuration rules determined in the past can also frequently continue to be applied so that the manual effort for creating the corresponding extension model is significantly reduced with increasing model version. By storing learned rules or by a learning mechanism, the user can thus be relieved even more considerably.

In principle, there may also be more than two semantic levels if, for example, an additional block library always comprises blocks with one or more further parameters. The transition from a "simple" annotation of a model for code generation to a more comprehensively annotated model (e.g. for code generation adapted to AUTOSAR) can also be regarded or treated as a transition between semantic layers. A step-by-step adaptation can then take place, transformation rules preferably always comprising the transition between a first semantic layer and the next semantic layer, the corresponding extension blocks having one or more extension parameters from a predefined set of extension parameters of this layer.

The determination of a configuration rule may comprise displaying a difference between the second block diagram and the first intermediate model and receiving a user input, wherein the user can edit, approve or discard the configuration rule derived from the difference, and wherein an edited or approved configuration rule is stored. In particular, the difference can be displayed in a graphical user interface, the user approving, adapting or discarding the determined configuration rule. Advantageously, a plurality of individual configuration rules, each relating to individual blocks or groups of individual blocks, may be determined on the basis of the comparison of two block diagrams.

Transformation rules and/or configuration rules may be stored in a database, and the user is provided with an operating interface in which a transformation rule and/or a configuration rule can be defined and/or edited, whereupon the new or changed rule is stored in the database. Transformation rules can be designed in various ways, for example as a script in a script environment, which can control a model editor. It may also be provided to assign a version to transformation rules and to limit the application of transformation rules to basic or extension models with predetermined versions and/or a predetermined creation time in order to, for example, take into account changes within semantic layers.

Two or more stored configuration rules may be compared to find commonalities in order to obtain a generalized configuration rule, and a generalized configuration rule may be displayed in an operating interface which enables editing, approving or discarding of the generalized configuration rule, the generalized configuration rule being stored in the case of editing or approving. Priorities may be assigned to configuration rules so that, for example, a generalized configuration rule is first applied and only non-covered cases are treated with special configuration rules. The assignment of priorities can be brought about by the user or automatically, for example on the basis of a measure for the universality of the configuration rule.

Block diagrams may be defined hierarchically, wherein a block in a higher level may comprise a plurality of blocks of a subordinate level, blocks of a subordinate level being assigned to a block of a higher level, and the identification of blocks taking place based on a block type indicating a functionality and/or based on a model path describing the location of the block in hierarchical models and/or based on a block name. If blocks include masks for specifying a representation, a block type may also be determined on the basis of a mask type (such as TL_CustomCode).

After the application of a configuration rule, at least one plausibility condition may be checked, wherein in the case of non-fulfillment, an error message is output and/or a graphical user interface for changing parameters, in particular extension parameters, is displayed. The annotated extension model may be checked for plausibility on the basis of a predetermined set of rules and possibly existing user rules. In the event of an error, the user can adapt the parameters in a graphical user interface so that, in other words, critical locations are automatically jumped to. Plausibility conditions can be predetermined or formulated by the user, wherein both general plausibility conditions, that is to say plausibility conditions that are always to be checked, and special plausibility conditions, that is to say plausibility conditions associated with a specific configuration rule, can be defined or checked.

For the case in which block diagrams are hierarchically defined, wherein a block in a higher level may comprise a plurality of blocks of a subordinate level, wherein blocks of a subordinate level are assigned to a block of a higher level, it is advantageous if a block of the one block diagram is equated with a block of the other block diagram before the two block diagrams are compared. From the point of view of the comparison program, the two blocks are thus the same block. Equating indicates a relative arrangement between the two models and avoids a plurality of misleading error messages when, for example, an additional hierarchy level was inserted. The user can specify the arrangement or the blocks to be equated in a graphical operating interface. It can also be provided that the assignment is stored in the form of a rule, with the reference being applied before the models are compared. It can furthermore be provided that for different hierarchy levels or separated areas, such as subsystems, a dedicated reference between two blocks is respectively specified in order to establish a relative position for the respective level.

For a rule that inserts a block into the block diagram, the inserted block being connected to at least one previously present block by a signal, the value of at least one parameter of the inserted block may be selected according to an additional rule on the basis of one or more parameter values of blocks adjacent in the signal flow, in particular of the direct predecessor and/or of the direct successor. The rule may be a transformation rule and the additional rule is a configuration rule. For example, for a newly inserted block, the scaling of a signal can be determined on the basis of the neighbor blocks, in particular blocks arranged above in the signal flow; signal properties or labels or designations can also generally be adopted.

Predefined blocks providing a functionality may be inserted from a library into the block diagram, wherein defined blocks having the same functionality may be present multiple times in the block diagram, and one or more transformation rules are assigned to at least one defined block. The one or more transformation rules may be stored as additional information in the block library. A transformation rule may also include that in the event that a plurality of instances of a block is present in the block diagram, a common function is defined for the instances and a data structure with the block variables is defined for each instance, the corresponding data structure being passed to the function depending on the block to be executed.

A rule may comprise the automatic insertion of a scaling block if the middle block of three blocks of the original block diagram arranged one after the other in the signal flow is missing or was deleted, the middle block has a different scaling of the output signal than the block upstream in the signal flow, and the block downstream in the signal flow is supposed to inherit or adopt the scaling according to a setting.

The method may additionally comprise generating source code from the fourth block diagram.

The invention further relates to a method for transferring changes between block diagrams comprising cyclically calculated models of blocks connected to signals, wherein a basic model comprises one or more basic blocks, wherein a basic block comprises one or more basic parameters, wherein an extension model comprises one or more basic blocks and at least one extension block, wherein an extension block comprises at least one additional extension parameter, in particular one or more parameters for code generation, wherein a first block diagram comprises an extension model in a first version, wherein a second block diagram comprises a basic model in a first version, wherein a third block diagram comprises an extension model in a second version, and wherein the first version is lower, i.e. older, than the second version, comprising the steps of applying at least one inverted transformation rule to the third block diagram in order to obtain a first intermediate model, wherein a transformation rule comprises a rule for identifying blocks and a change to be applied to recognized blocks, wherein according to a transformation rule, at least one extension block is inserted and/or at least one basic block is deleted, wherein an inverted transformation rule reverses the change of the assigned transformation rule, comparing the first intermediate model with the second block diagram in order to determine changed basic blocks and/or basic parameters, transferring the determined changes to the first block diagram in order to obtain a second intermediate model, and applying at least one transformation rule to the second intermediate model in order to obtain a fourth block diagram.

In this form, the method according to the invention enables the transfer of changes of a new version of an extension model to an old version of an extension model, wherein a change within the semantic layers may also have occurred between different versions. In serial control devices, the version of the code generator or of the entire tool chain is generally recorded. In this case, the method according to the invention makes it possible, for example, to apply a later created patch to an old model version which was created with an old tool chain or an old version of the code generator. By taking the path through the basic models, copying incompatible language elements of the new version is avoided. Advantageously, a distinction is made between transformation rules of different versions, one or more language elements being applied or avoided in the rule as a function of the version.

The invention further relates to a method for configuring a control device, wherein the control device comprises at least one arithmetic unit and may have at least one sensor and/or at least one actuator for acquiring data from and/or acting upon a physical process, the method comprising the steps of a. creating a fourth block diagram with a method according to the invention for transferring changes,
b. generating source code from the fourth block diagram,
c. compiling the source code for the arithmetic unit so that an executable code is generated,
d. transferring the executable code to the control device, and
e. storing the executable code in a non-volatile memory of the control device and/or executing the executable code by the control device's arithmetic unit.

Furthermore, the invention relates to a computer program product with a computer-readable storage medium on which instructions are embedded that, if executed by a processor, cause the processor to be configured to execute a method according to the invention for transferring changes.

The invention also relates to a computer system comprising a human-machine interface, a non-volatile memory and a processor, wherein the processor is configured to execute a method according to the invention for transferring changes.

The invention is explained in more detail below with reference to the drawings. In doing so, similar parts are labeled with identical designations. The illustrated embodiments are illustrative and not necessarily true to scale.

FIG. 1 shows an exemplary embodiment of a computer system PC. This computer system has a processor CPU, which may be implemented as a multi-core processor in particular, a working memory RAM and a bus controller BC. The computer system PC may be configured to be manually operated directly by a user, wherein a monitor DIS may be connected via a graphics card GPU, and a keyboard KEY and a mouse MOU may be connected via a peripheral interface HMI. In principle, the human-machine interface of the computer system PC could also be configured as a touch interface. The computer system also includes a non-volatile data memory HDD which may be configured in particular as a hard disk and/or solid state disk, along with an interface NET, in particular a network interface. A control device ES may be connected via the interface NET. In principle, one or more arbitrary interfaces, in particular wired interfaces, can be present on the computer system PC and can each be used for the connection to a control device ES. A network interface according to the Ethernet standard may be used; the interface NET may also be configured to be wireless, such as a wireless local area network (WLAN) interface in particular, or according to a standard such as Bluetooth.

The control device ES may be configured as a serial control device or as an evaluation board for a target platform. It may be advantageous to include an interface NET for connecting to the computer system PC, a microcontroller MCR with an architecture deviating from that of the processor of the computer system, a working memory RAM and a non-volatile memory NVM. A control device ES is not required for executing the invention; this control device ES may be used for tests of the models.

In principle, the computer system can also be configured as a client-server system, wherein one or more software components are executed on external servers.

Figure 2:
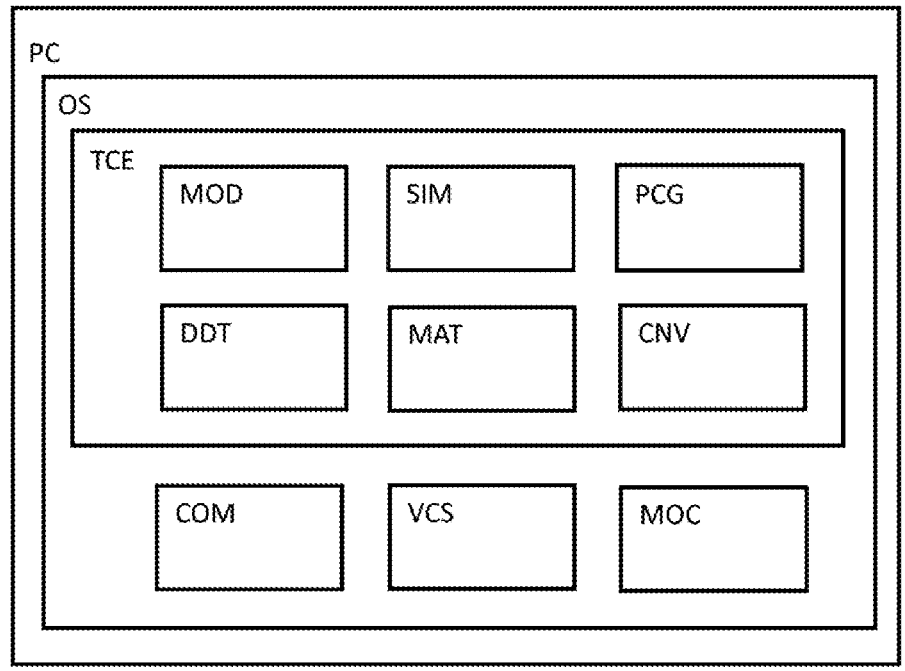
FIG. 2 depicts an exemplary schematic representation of software components available on a computer system.

FIG. 2 shows an exemplary diagram of software components installed on the computer system PC. Such components use mechanisms of the operating system OS, for example to access the non-volatile memory HDD or to establish a connection to an external computer via the network interface NET.

A technical computing environment TCE enables the creation of models and the generation of source code from the models. In a modeling environment MOD, models of a dynamic system may be created via a graphical user interface. In particular, these may be block diagrams that comprise multiple blocks and describe the temporal behavior and/or internal states of a dynamic system. At least some of the blocks are connected by signals; that is, directional connections for the exchange of data, which can be scalar or composite. Blocks can be atomic; that is, they can provide a predefined functionality in one step. If block diagrams are hierarchical, a large number of blocks at a subordinate level can describe the structure of a block at a superordinate level. Atomic blocks may then also include a large number of blocks at a subordinate level. Composite blocks may in particular be subsystems; subsystems may have additional properties, such as the implementation in a separate function and/or triggering of the execution of the subsystem via a dedicated signal. In subsystems, special blocks may be arranged to further specify the properties of the subsystem. The computing environment TCE may comprise one or more libraries, from which blocks or modules may be selected for the structure of a model. In a script environment MAT, instructions may be entered interactively or via a batch file in order to perform calculations or modify the model. The computing environment TCE also includes a simulation environment SIM which is configured to interpret or execute the block diagram in order to investigate the temporal behavior of the system. Such calculations may be performed with high accuracy floating-point numbers on one or more cores of the microprocessor CPU of the computer system.

With the help of a code generator PCG, a source code may be generated from a created model, for example in a programming language such as C. Additional information regarding the model, in particular regarding the block variables, may be in a definition data collection DDT. Value ranges and/or scalings may be assigned to the block variables in order to support a calculation of the model with fixed-point instructions. The desired properties of the source code, for example conformity to a standard such as MISRA, may also be set or stored in the definition data collection DDT. Each block variable may be assigned to a given variable type, and one or more desired properties, such as the permissibility of optimizations, such as a grouping of variables, is set. The code generator PCG preferentially evaluates the settings of the definition data collection DDT and takes them into account when generating the source code. The definition data collection DDT may have a tree structure or may be stored as a simple file in a memory of the computer system; alternatively, storing the definition data in a dedicated database system may be provided. The definition data collection may have a program interface and/or import/export functions. The technical computing environment TCE further comprises a converter CNV, which converts a model with the parameters relevant to code generation into an intermediate form suitable for the comparison.

The computer system PC has a compiler COM and a linker, which may be configured for generating binary files that may be executed on a control device ES and/or the computer system PC. In principle, a large number of compilers may be available, in particular cross-compilers for different target platforms, in order to support control devices or evaluation boards ES with different processor architectures. Furthermore, a comparison program MOC is present which receives two models in the intermediate form and determines and may display differences. In addition, a configuration rule can be determined or derived from one or more determined differences. The comparison program may comprise a graphical user interface in which the user can view and subsequently edit, confirm or discard a derived configuration rule. There may also be a version control system VCS storing various versions of block diagrams and/or generated intermediate forms in a database.

Figure 3:
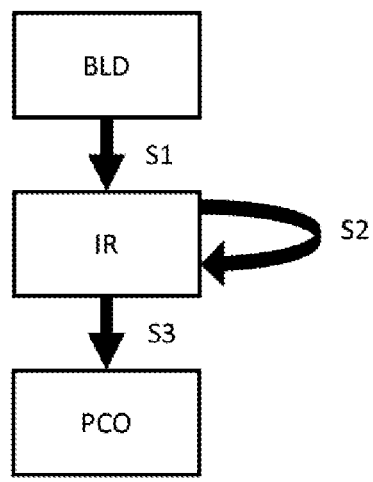
FIG. 3 depicts an exemplary diagram of generating source code.

FIG. 3 shows an exemplary diagram for generating source code via a code generator. The method may be executed entirely by a processor of an exemplary embodiment of the computer system PC; however, it may also be executed in a client-server environment with an operating computer and one or more servers connected by a network, wherein, in particular, computationally intensive steps are performed on the servers.

In a first step S1, a transformation, the selected model is transformed from one or more blocks of the block diagram BLD into an intermediate representation IR which may comprise one or more hierarchical graphs. In particular, this can be a data flow graph, a control flow graph or a tree structure. In addition to the block diagram BLD, it may be advantageous to also take additional information from a definition data collection DDT into account when generating the intermediate representation, or incorporate said information thereinto. This may also include situations in which elements are generated based on information in the definition data collection DDT or in which properties of elements or settings relevant to code generation, such as the data type of a variable, are extracted from the data definition collection DDT.

In a second step S2, an optimization, the hierarchical graphs are optimized in order to reduce the number of variables required and/or memory consumption, such as stack usage, and/or the number of operations and/or processor instructions and/or the execution time of the source code. Such optimization may comprise a large number of intermediate steps in which further intermediate representations between the model/block diagram and source code/program text are generated. In particular, it may be provided that, in each intermediate step, a set of original hierarchical graphs is converted into a different set of modified hierarchical graphs, wherein one or more optimization rules are applied. Various strategies, such as constant folding or the elimination of dead code, may be applied during optimization. It may also be provided that individual optimizations are applied already within the framework of the transformation in step S1, in particular if they can be performed more easily on a block diagram representation.

In a third step S3, a translation, the optimized intermediate representation IR or the optimized hierarchical graphs, which result from the entire intermediate steps performed, are translated into source code PCO of a textual programming language, such as, in particular, C code. Moreover, an additional optimization may be carried out in this step, in particular in such a manner that the generated instructions represent a subset of the instructions that are, in principle, included by the language, and/or that the generated control structures represent a subset of the control structures that are, in principle, included by the language. This makes it possible to fulfill precisely defined rules. Alternatively or in addition, it may be provided that additional information, such as a reference between the program line and the block of the block diagram BLD, is generated, and in particular that it is incorporated into the source code in the form of comments in order to improve the readability of the source code PCO and/or to simplify debugging.

During or after code generation, information regarding the current block diagram or results of code generation, such as warnings, may be stored in the definition data collection. Such information may be used, for example, to influence a compilation of the generated source code or to provide meta information for other tools, such as calibration information in ASAP2 format or information for generating an intermediate layer according to the AUTOSAR standard. Alternative embodiments of the invention may provide that code in a hardware description language or a configuration of a programmable hardware module is generated from the block diagram.

Figure 4:
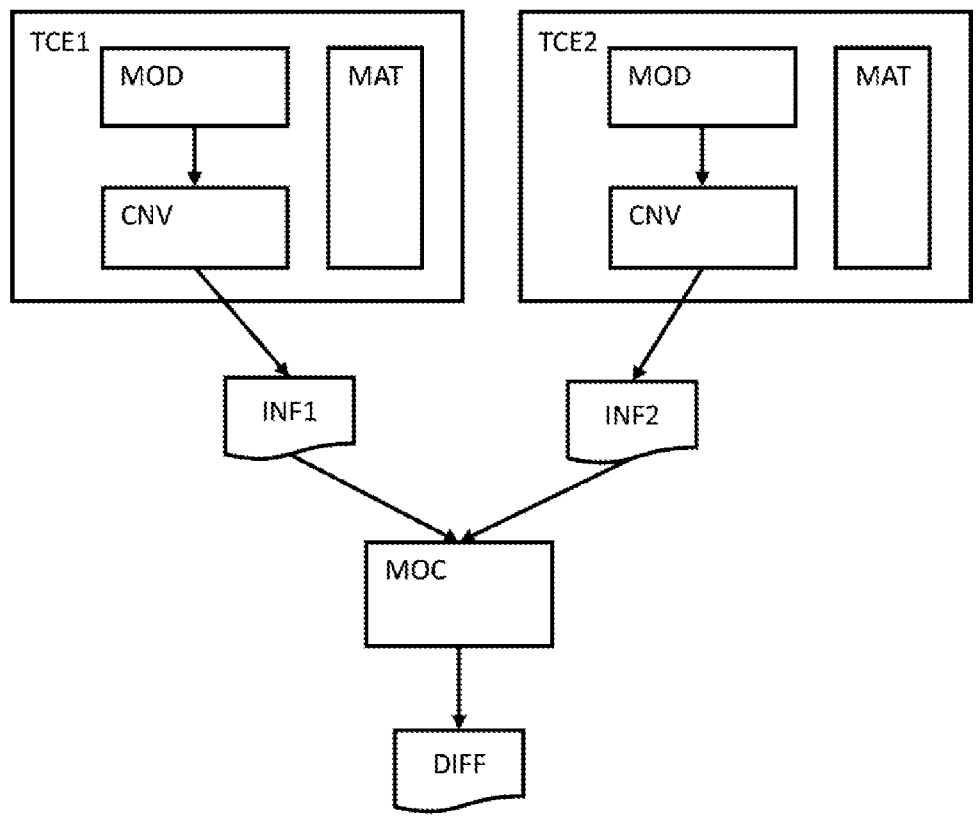
FIG. 4 depicts an exemplary schematic representation of a comparison between two block diagrams.

FIG. 4 schematically illustrates an exemplary comparison between two block diagrams. In a first step, the first block diagram under consideration is opened in a model editor MOD of a technical computing environment TCE1 and brought into an intermediate form INF1 using a converter CNV. This intermediate form is particularly suitable for the comparison and comprises current parameter values which were adapted in the script environment MAT. The script environment MAT can be used for the automated control of model editor MOD and converter; furthermore, it can be provided to filter, change, or supplement the comparison result via filter scripts. In a second step, the second block diagram under consideration is opened thereafter or in parallel in a model editor MOD of a technical computing environment TCE2 and brought into an intermediate form INF2 using a converter CNV, wherein a script environment MAT can control and/or filter. In a sequential processing, TCE1 and TCE2 may designate the same technical computing environment, and the intermediate forms INF1 and INF2 are stored at least temporarily in the file system or a database. In a parallel embodiment, two independent instances TCE1, TCE2 of a technical computing environment are opened.

The two intermediate forms are fed to a comparison program MOC which generates a list of differences DIFF. The comparison program may also comprise a component which determines a configuration rule on the basis of a difference between the first and the second block diagram. Depending on the number of differences, a plurality of configuration rules can thus be derived from a comparison of two block diagrams. Configuration rules obtained can be stored in a database, wherein a check may take place as to whether a corresponding configuration rule is already present so that storing should not take place again.

Figure 5:
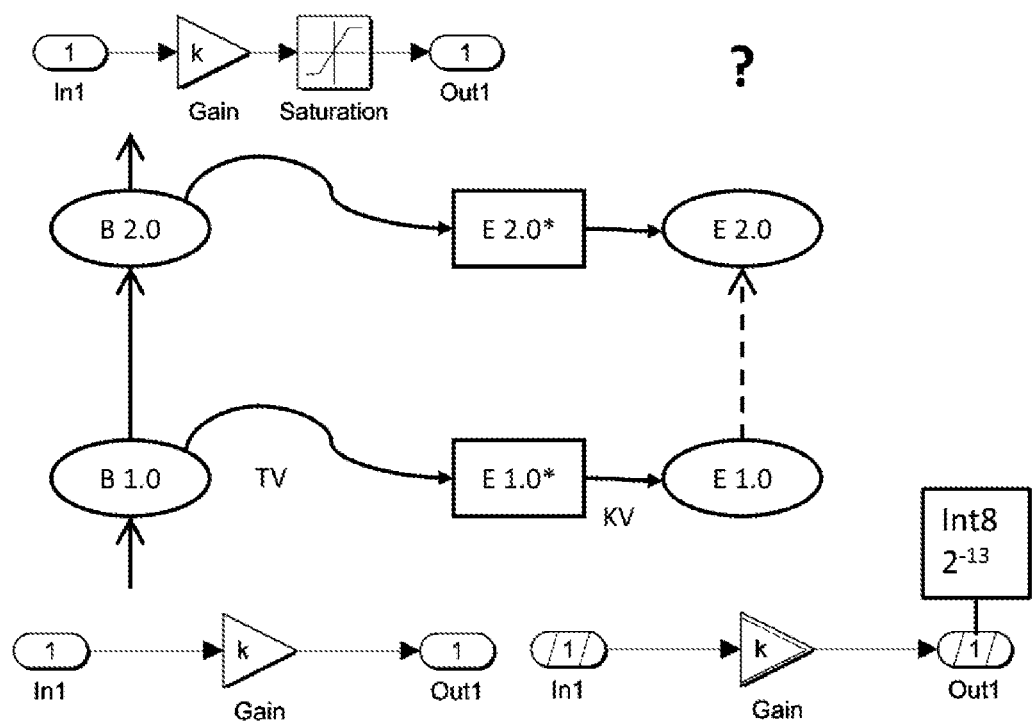
FIG. 5 depicts an exemplary schematic representation of various embodiments of a model.

FIG. 5 schematically shows an exemplary situation in which changes to the basic model are to be transferred to an extension model. In particular, the basic model can be a Simulink model and the extension model can be a Target-Link model.

A basic model B 1.0 in an older version, an extension model E 1.0 and a basic model B 2.0 in a new version are shown. The basic model B 1.0 comprises an input port In1, a gain block Gain, which amplifies the input signal by a factor k (or possibly attenuates it if k<1), and an output port Out1. In the extension model E 1.0, input and output ports were replaced by a corresponding port with additional parameters (indicated by two diagonal lines in the port). The gain block was also replaced by a corresponding extension block (indicated by double lines). For the output port, two extension parameters are indicated by way of example, namely a desired data type Int8 of the output variables and a desired scaling $2^{-13}$. The new version of the basic model B 2.0 comprises a saturation block Saturation, which restricts the output signal of the gain block to a predetermined interval. An extension model E 2.0 in a new version is required for code generation.

The differences between original basic model B 1.0 and revised basic model B 2.0 can be determined on the basis of a comparison of the two models using comparison program MOC. In order to prevent the occurrence of a plurality of supposed differences, it may be advantageous when the models are aligned in this case, that is to say the user defines that a particular block in the older basic model B 1.0 corresponds to a particular block in the new basic model B 2.0 or is equated therewith. This applies in particular to large models with a plurality of hierarchical levels and a plurality of individual blocks.

The differences between extension model E 1.0 and original basic model B 1.0 can be divided into general transformations, such as replacing an output port in basic form with an output port in the extended representation, and specific configurations, such as selecting a particular scaling at the output port. Transformation rules TV and configuration rules KV can thus be distinguished. If only transformation rules are applied to a basic model, an intermediate model E 1.0* or E 2.0* is produced, which contains extension blocks but is not suitable for code generation due to lack of suitable attribution. Suitable attributes or extension parameters are frequently context-dependent and therefore change with the placement of the corresponding block in the model and/or the adjacent blocks or their parameters. In contrast, a transformation once defined can generally be applied unchanged to all basic blocks of a predetermined type.

Figure 6:
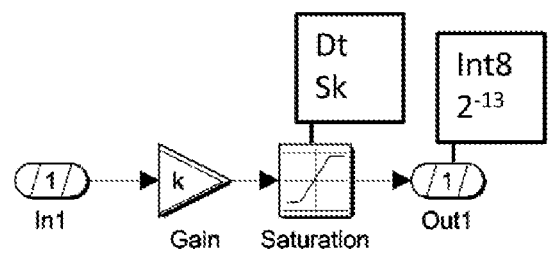
FIG. 6 depicts an exemplary schematic representation of a converted form of a model.

FIG. 6 schematically illustrates an exemplary converted form of the new model of the situation outlined in FIG. 5. The input port of the new basic model B 2.0 was replaced by the corresponding extension port with additional parameters via a transformation rule. Values for the additional parameters can be adapted by a configuration rule which is or was determined from the comparison of the (extended) input port in the transformed basic model B 1.0, i.e. the intermediate model E 1.0*, with the extended input port in the extension model E 1.0. The gain block was replaced by an extended gain block via a further transformation rule. Values for the additional parameters can be adapted by a configuration rule which is or was determined from the comparison of the (extended) gain block in the intermediate model E 1.0* with the extended gain block in the extension model E 1.0. Analogously, the output port can also be transferred to the new extension model E 2.0 by a general transformation rule and a position-dependent configuration rule. For example, a value Int8 for the data type and a value $2^{-13}$ for the scaling at the output port are shown.

The saturation block in the new basic model B 2.0 was replaced by an extended saturation block (indicated by double lines above and below) via a transformation rule. A value Dt for the data type and a value Sk for the scaling cannot be determined from a comparison of the extension model E 1.0 with the intermediate model E 1.0* since no saturation block occurs in the basic model B 1.0. A directly applicable location-specific configuration rule is thus not available.

In the present situation, wherein the new block (saturation block) is inserted between a predecessor (gain block) and a successor (output port), it is advantageous to obtain possible values for extension parameters from a consideration of the adjacent blocks; this could be called a generalized or adaptive configuration rule. For example, the values of the extension parameters of the extended output port can be adopted here. In an alternative procedure, the values of predecessor and successor can be compared, wherein in the case of a match, the common values for the added block can be adopted. Whether the one or the other procedure is more advantageous may be different for each individual extension parameter. The comparison program therefore may comprise an operating interface in which the user can choose between the various possibilities. The selected procedure may then be stored as a new configuration rule.

Figure 7:
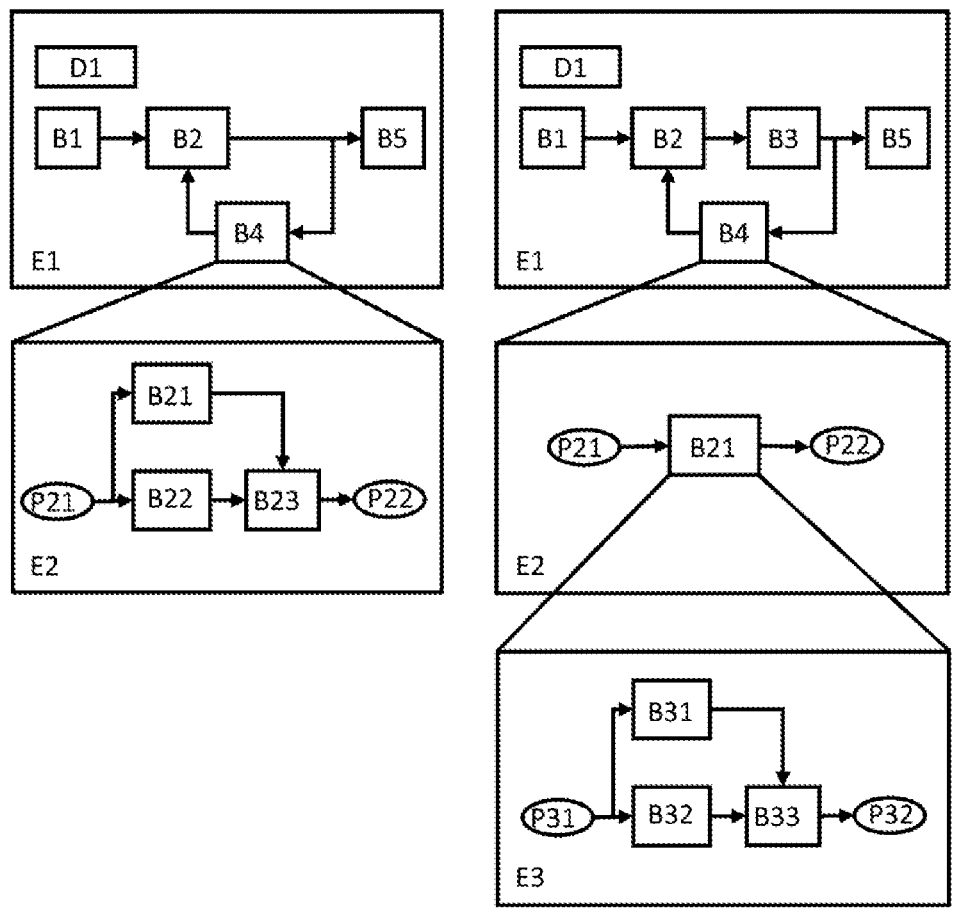
FIG. 7 depicts an exemplary schematic representation of two hierarchical models.

FIG. 7 shows an exemplary schematic representation of two hierarchical models to be compared. On the left side, a first block diagram is shown which has a first hierarchy level E1 and a second hierarchy level E2. On the right side, a second block diagram with three hierarchy levels E1, E2 and E3 is shown.

In the hierarchy level E1, the first block diagram comprises a definition block D1 and four blocks B1, B2, B4, B5 connected to signals. Block B4 is a hierarchical block whose functionality is defined by a plurality of blocks in the subordinate hierarchy level E2. For the sake of simplicity, it is assumed that the blocks B1, B2, B5 are simple blocks without subordinate hierarchy levels; in principle, however, further hierarchical blocks could also be present which would then be implemented in separate subordinate hierarchy levels in each case.

In the subordinate hierarchy level E2, the first block diagram comprises an input port P21, an output port P22 and three blocks B21, B2, B23 which are connected to signals and perform arithmetic operations.

The second block diagram comprises in the first hierarchy level E1 a definition block D1 and five blocks B1, B2, B3, B4, B5 connected to signals. Compared to the first block diagram, an additional block (B3) was inserted between B2 and B5. As explained above, values for extension parameters of the transformed block can be determined from a comparison of the predecessor with the successor. However, for scaling it may also happen, for example, that the newly added block invalidates the previous values of the successor. If block B3 is, in particular, a gain block with a large gain, the previous data type for the signal arriving in B5 can also overflow. A worst-case scaling for subsequent blocks may therefore be proposed after the insertion of blocks that are problematic in this respect. Specifically, for example, an 8-bit integer variable could be replaced by a 16-bit integer variable. The proposed change may be displayed to the user in a graphical user interface so that he can confirm, edit or discard it. In addition, it can also be provided that a list with such proposals or critical locations in the changed model is displayed. This allows the user to selectively jump to the corresponding locations and to select the appropriate procedure in each case.

For simplicity, it is assumed in the present case that only block B4 in the first hierarchy level of the second block diagram is a hierarchical block. The second hierarchy level comprises an input port P21, a block B21 and an output port P22. Block B21 is a hierarchical block whose implementation is modeled by further blocks in the subordinate third hierarchy level E3. The third hierarchy level E3 comprises an input port P31, three blocks B31, B32, B33 and an output port P32. In a direct comparison of the first block diagram with the second block diagram, all blocks below the respective first hierarchy level would be represented as differences. This may be useful; for example, if the left block B4 had been replaced by a semantically completely different block. However, it may also be misleading if, for example, level E2 of the first block diagram matches level E3 of the second block diagram, wherein an additional hierarchy level was inserted as a space for later extensions (such as a prefiltering of the input signals). A direct comparison would result in a plurality of misleading differences. In this case, it may be advantageous to equate block B4 on the left with block B21 on the right, because the subordinate structurally matching modeling can then be checked for deviating parameters. This decision may be made by the user, and it can be stored, for example, as a separate rule to be performed before the comparison.

Figure 8:
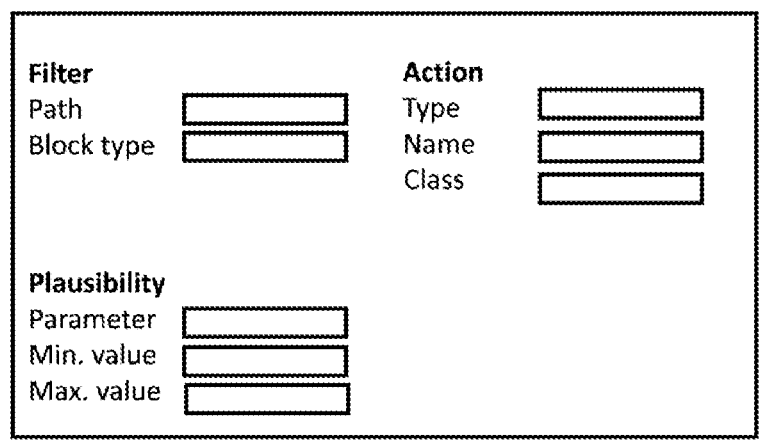
FIG. 8 depicts an exemplary schematic representation of an exemplary operating interface.

FIG. 8 schematically illustrates an exemplary operating interface that enables editing of transformation and/or configuration rules. In principle, a rule comprises a filter, that is to say a condition to be checked or a pattern to be checked for matching, and an action, that is to say a change to be applied when the condition is fulfilled or the pattern matches.

A configuration rule determined from a comparison between an extension model and the associated intermediate model is generally initially specific or location-dependent. In hierarchical models, the location can be specified, for example, in the form of a block path comprising superordinate subsystems or hierarchy levels. After a plurality of configuration rules has been determined and stored in a database, it may be checked whether a plurality of individual configuration rules can be generalized. In addition, the user can specify a priority, wherein a fundamental preference of general configuration rules can also be provided. Optionally, it may also be provided that, after identifying and storing a generalized configuration rule, one, several or all of the individual configuration rules covered thereby are deleted from the database or marked as inactive. Similarly to a transformation rule, a general configuration rule can contain a filtering based on the block type; however, it may also be provided that the presence of a particular environment, that is to say defined blocks as predecessor and/or successor, is used as a filter criterion.

In the user interface shown, a "Filter" section, in which the user can enter a filter, is shown on the left. For this purpose, a "Path" field and an associated input surface as well as a "Block type" field with an associated input surface are provided. In principle, further fields or properties can also be used for filtering. In the example shown, the user can thus specify the filtering only for a specific path or only for a specific block type. Furthermore, it is also conceivable for the user to formulate a combined criterion such as "the path comprises a particular subsystem" and "the block type has a particular value."

In the user interface shown, an "Action" section is shown on the right, in which the user specifies an action to be performed or change to be applied when the condition is fulfilled or at all locations that satisfy the condition. For this purpose, a "Type" field, a "Name" field and a "Class" field are respectively provided with an associated input surface. Accordingly, the change to be applied may include setting the block type to the value specified in the "Type" field and/or setting the block name to the value specified in the "Name" field and/or setting the variable class to the value specified in the "Class" field. In principle, other, unspecified changes can also be applied or other, unspecified actions can also be carried out.

In the user interface shown, a "Plausibility" section is shown below, in which the user can predetermine a condition to be checked after an applied change. For this purpose, a "Parameter" field, a "Min. value" field and a "Max. value" field are respectively provided with an associated input surface. In addition, it is also possible for the user to be able to predetermine whether a general warning or the corresponding location in the model is to be displayed when the plausibility condition is not fulfilled or whether the applied change is to be reversed when there is a lack of plausibility.

A method according to the invention or a corresponding system enables the user to successively build a collection of configuration rules or transformation rules. Particularly if code is to be generated from each of a plurality of successive versions of a basic model, the adaptation effort noticeably decreases with increasing version.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transferring changes between block diagrams comprising cyclically calculated models of blocks connected to signals, wherein a basic model comprises one or more basic blocks, wherein a basic block comprises one or more basic parameters, wherein an extension model comprises one or more basic blocks and at least one extension block, wherein an extension block comprises one or more parameters for code generation, wherein a first block diagram comprises a basic model in a first version, wherein a second block diagram comprises an extension model resulting from the basic model of the first version, wherein a third block diagram comprises a basic model in a second version, and wherein the first version is older than the second version, wherein the method comprises:

applying a plurality of transformation rules to the first block diagram to obtain a first intermediate model, wherein a transformation rule includes a rule for identifying blocks and a change to be applied to recognized blocks, wherein at least one extension block is inserted and/or at least one basic block is deleted;

comparing the second block diagram to the first intermediate model;

determining at least one configuration rule from the comparison, a configuration rule comprising a rule for identifying a block or parameter and a change to be applied to an extension parameter;

applying the plurality of transformation rules to the third block diagram to obtain a second intermediate model; and applying the at least one configuration rule to the second intermediate model to obtain a fourth block diagram;

wherein two or more stored configuration rules are compared to find commonalities to obtain a generalized configuration rule, and wherein the generalized configuration rule is displayed in an operating interface which enables editing, approving or discarding of the generalized configuration rule, the generalized configuration rule being stored in the case of editing or approving.

2. The method according to claim 1, wherein the determination of a configuration rule comprises displaying a difference between the second block diagram and the first intermediate model and receiving a user input to facilitate the user editing, approving or discarding the configuration rule derived from the difference, and wherein an edited or approved configuration rule is stored.

3. The method according to claim 1, wherein transformation rules and/or configuration rules are stored in a database, and wherein the user is provided with an operating interface in which a transformation rule and/or a configuration rule can be defined and/or edited, whereupon a new or changed rule is stored in the database.

4. The method according to claim 1, wherein block diagrams are defined hierarchically, wherein a block in a higher level comprises a plurality of blocks of a subordinate level, wherein blocks of a subordinate level are assigned to a block of a higher level, and wherein the identification of blocks takes place based on a block type indicating a functionality and/or based on a model path describing the location of the block in hierarchical models and/or based on a block name.

5. The method according to claim 1, wherein after the application of a configuration rule at least one plausibility condition is checked, wherein in the case of non-fulfillment, an error message is output and/or a graphical user interface for changing extension parameters is displayed.

6. The method according to claim 1, wherein block diagrams are hierarchically defined, wherein a block in a higher level comprises a plurality of blocks of a subordinate level, wherein blocks of a subordinate level are assigned to a block of a higher level, and wherein a block of the one block diagram is equated with a block of the other block diagram before the two block diagrams are compared.

7. The method according to claim 1, wherein for a rule that inserts a block into the block diagram, the inserted block being connected to at least one previously present block by a signal, the value of at least one parameter of the inserted block is selected according to an additional rule on the basis of one or more parameter values of blocks adjacent in the signal flow.

8. The method according to claim 1, wherein predefined blocks providing a functionality may be inserted from a library into the block diagram, wherein defined blocks having the same functionality are present multiple times in the block diagram, and wherein one or more transformation rules are assigned to at least one predefined block.

9. The method according to claim 1, wherein a rule comprises the automatic insertion of a scaling block if the middle block of three blocks of the original block diagram arranged one after the other in the signal flow is missing or was deleted, wherein the middle block has a different scaling of the output signal than the block upstream in the signal flow, and wherein the block downstream in the signal flow is to inherit or adopt the scaling according to a setting.

10. The method according to claim 1, further comprising: generating source code from the fourth block diagram.

11. A method for transferring changes between block diagrams comprising cyclically calculated models of blocks connected to signals, wherein a basic model comprises one or more basic blocks, wherein a basic block comprises one or more basic parameters, wherein an extension model comprises one or more basic blocks and at least one extension block, wherein an extension block comprises one or more parameters for code generation, wherein a first block diagram comprises an extension model in a first version, wherein a second block diagram comprises a basic model in a first version, wherein a third block diagram comprises an extension model in a second version, and wherein the first version is older than the second version, wherein the method comprises:
    applying at least one inverted transformation rule to the third block diagram to obtain a first intermediate model, wherein a transformation rule comprises a rule for identifying blocks and a change to be applied to recognized blocks, wherein according to a transformation rule, at least one extension block is inserted and/or at least one basic block is deleted, wherein an inverted transformation rule reverses the change of the assigned transformation rule;
    comparing the first intermediate model with the second block diagram to determine changed basic blocks and/or basic parameters;
    transferring the determined changes to the first block diagram to obtain a second intermediate model; and
    applying at least one transformation rule to the second intermediate model to obtain a fourth block diagram;
    wherein two or more stored configuration rules are compared to find commonalities to obtain a generalized configuration rule, and wherein the generalized configuration rule is displayed in an operating interface which enables editing, approving or discarding of the generalized configuration rule, the generalized configuration rule being stored in the case of editing or approving.

12. A method for configuring a control device, wherein the control device comprises at least one arithmetic unit, the method comprising:
    generating a fourth block diagram according to the method of claim 1;
    generating source code from the fourth block diagram;
    compiling the source code for the arithmetic unit so that an executable code is generated;
    transferring the executable code to the control device; and
    storing the executable code in a non-volatile memory of the control device and/or executing the executable code by the at least one arithmetic unit.

13. A non-transitory computer-readable medium having processor-executable instructions stored thereon for transferring changes between block diagrams comprising cyclically calculated models of blocks connected to signals, wherein a basic model comprises one or more basic blocks, wherein a basic block comprises one or more basic parameters, wherein an extension model comprises one or more basic blocks and at least one extension block, wherein an extension block comprises one or more parameters for code generation, wherein a first block diagram comprises a basic model in a first version, wherein a second block diagram comprises an extension model resulting from the basic model of the first version, wherein a third block diagram comprises a basic model in a second version, and wherein the first version is older than the second version, wherein the processor-executable instructions, when executed, facilitate:
    applying a plurality of transformation rules to the first block diagram to obtain a first intermediate model, wherein a transformation rule includes a rule for identifying blocks and a change to be applied to recognized blocks, wherein at least one extension block is inserted and/or at least one basic block is deleted;
    comparing the second block diagram to the first intermediate model;
    determining at least one configuration rule from the comparison, a configuration rule comprising a rule for identifying a block or parameter and a change to be applied to an extension parameter;
    applying the plurality of transformation rules to the third block diagram to obtain a second intermediate model; and
    applying the at least one configuration rule to the second intermediate model to obtain a fourth block diagram;
    wherein two or more stored configuration rules are compared to find commonalities to obtain a generalized configuration rule, and wherein the generalized configuration rule is displayed in an operating interface which enables editing, approving or discarding of the generalized configuration rule, the generalized configuration rule being stored in the case of editing or approving.

14. A computer system, comprising:
    a human-machine interface;
    a non-volatile memory; and
    a processor configured to cooperate with the human-machine interface and the non-volatile memory to facilitate a method for transferring changes between block diagrams comprising cyclically calculated models of blocks connected to signals, wherein a basic model comprises one or more basic blocks, wherein a basic block comprises one or more basic parameters, wherein an extension model comprises one or more basic blocks and at least one extension block, wherein an extension block comprises one or more parameters for code generation, wherein a first block diagram comprises a basic model in a first version, wherein a second block diagram comprises an extension model resulting from the basic model of the first version, wherein a third block diagram comprises a basic model in a second version, and wherein the first version is older than the second version, wherein the method comprises:
    applying a plurality of transformation rules to the first block diagram to obtain a first intermediate model, wherein a transformation rule includes a rule for identifying blocks and a change to be applied to recognized blocks, wherein at least one extension block is inserted and/or at least one basic block is deleted;
    comparing the second block diagram to the first intermediate model;
    determining at least one configuration rule from the comparison, a configuration rule comprising a rule for identifying a block or parameter and a change to be applied to an extension parameter;

applying the plurality of transformation rules to the third block diagram to obtain a second intermediate model; and applying the at least one configuration rule to the second intermediate model to obtain a fourth block diagram;

wherein two or more stored configuration rules are compared to find commonalities to obtain a generalized configuration rule, and wherein the generalized configuration rule is displayed in an operating interface which enables editing, approving or discarding of the generalized configuration rule, the generalized configuration rule being stored in the case of editing or approving.

* * * * *